May 25, 1937. H. C. WRIGHT 2,081,318
SHEARING MACHINE AND COMB THEREFOR
Filed Nov. 7, 1935
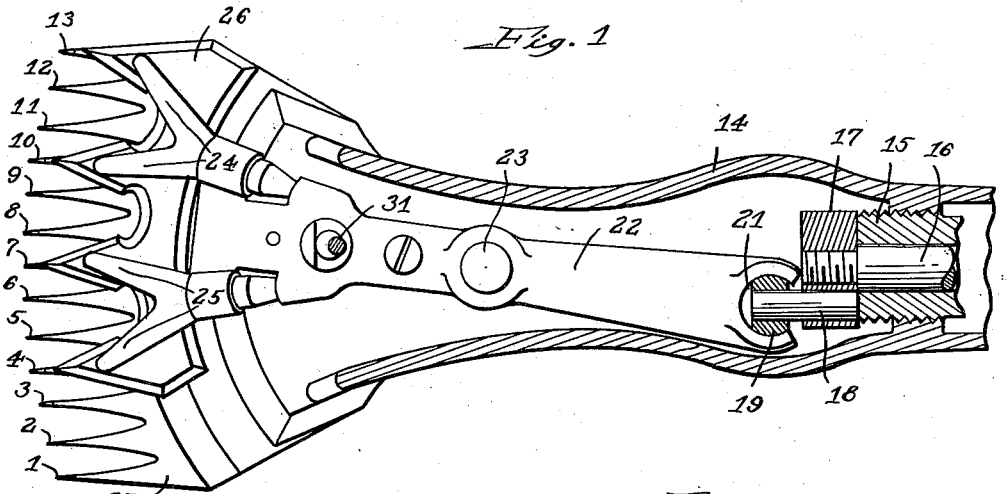
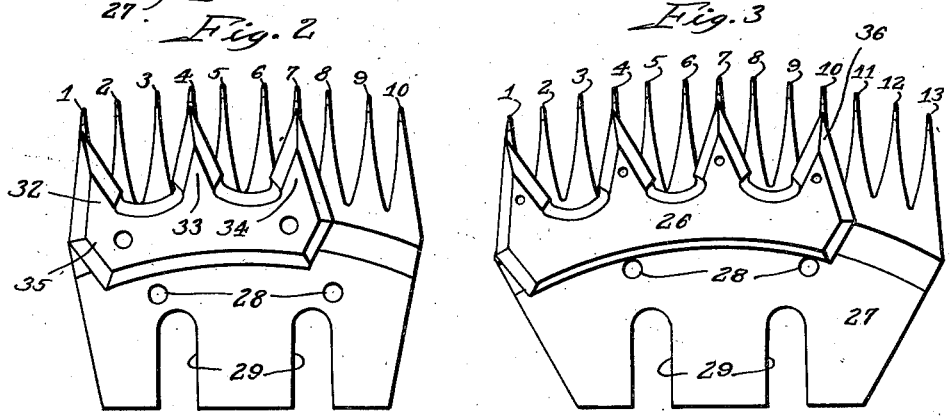
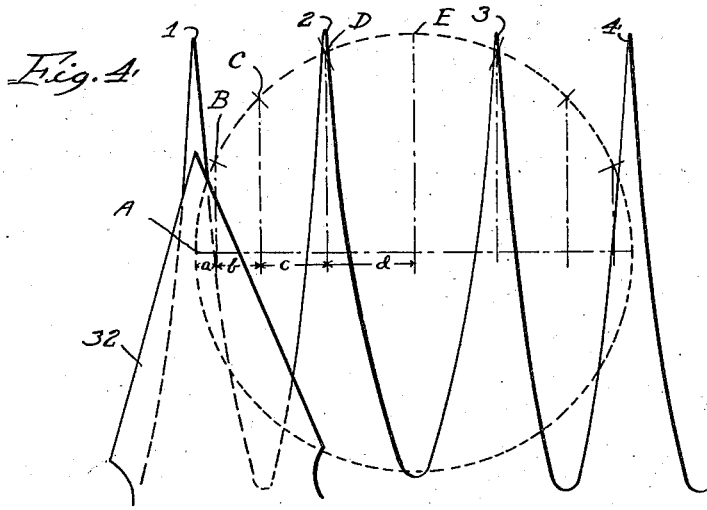
Inventor:
Horace C. Wright
By Wilson, Powell,
McKenna & Wintercorn
Attys.

Patented May 25, 1937

2,081,318

UNITED STATES PATENT OFFICE 2,081,318

SHEARING MACHINE AND COMB THEREFOR

Horace C. Wright, Chicago, Ill., assignor to Chicago Flexible Shaft Company, Chicago, Ill., a corporation of Illinois Application November 7, 1935, Serial No. 48,631

7 Claims. (Cl. 30—1)

This invention relates to animal shearing machines and has special reference to the cutting blades thereof commonly known as combs and cutters.

In the shearing of sheep and the like, two conventional types of combs and cutters are used, the ten-tooth comb using a three-prong cutter and the thirteen-tooth comb using a four-prong cutter. In each case, the teeth of the comb are spaced ¼" apart at the tip. With the ten-tooth comb, when the outside prong of the cutter rests on the outside tooth of the comb, the next or center prong of the cutter rests on the fourth tooth of the comb, leaving two teeth uncovered. The opposite prong of the cutter rests on the seventh tooth of the comb, also leaving two teeth uncovered. When the cutter is oscillated across the comb, each tooth of the cutter moves forward three teeth on the comb which carries it across to the opposite side of the comb so that all of the teeth of the comb are passed over. On the thirteen-tooth comb, a four-prong cutter of the same design is used covering the comb in the same way. The quarter inch spacing between the extreme points of the comb teeth is a standard spacing employed by all comb manufacturers and was adopted as a result of long experience as drawing into the comb the maximum amount of wool which could be handled by the cutters without undue drag on the operation of the shear. If the distance between all the teeth of the comb was reduced beyond this point, the obstructional effect of the comb and cutter on the wool was increased, whereas, if the distance between all the teeth was increased, more wool was gathered in the teeth than the cutters would efficiently handle.

Some years past an attempt was made to widen the standard 2¼" ten-tooth comb by spreading the teeth slightly wider apart in order to gain an extra ¼" to make the comb 2½" wide, the object being to obtain a wider cut in the wool resulting in faster shearing. It was also hoped that the wool might enter between the teeth more easily. In this comb the prongs of the three-tooth cutter were also spread slightly to match the increased space between the comb teeth. This comb did not prove to be satisfactory. It was the opinion of the shearers and those who used the comb that the spreading of the teeth permitted too much wool to enter between the teeth so that a three-prong cutter operating in the same way as before, could not deal with the extra wool, thereby slowing down the movement of the cutting blades through the wool. It was contended at the time and is still contended by many, that the thirteen-tooth comb was too wide for easy shearing and could not be "filled", except by the most experienced skilled shearers. It was thought, however, that the width of the standard 2¼" ten-tooth comb could be increased to some extent giving more speed in shearing without increasing the width beyond that which most shearers could operate with reasonable ease. However, since it has been demonstrated that greater than ¼" spacing between the teeth of the comb could not be employed and also that by adding the necessary three additional teeth to the comb, the comb became too wide, no means could be perceived for obtaining a comb of intermediate width. However, shortly thereafter an extra tooth was added to the comb so as to gain the extra ¼" and obtain a 2½" comb. This experient again was not satisfactory because it was necessary to use a three-prong cutter and when the cutter stopped at the end of the stroke, each prong of the cutter was not resting on the center of a corresponding tooth of the comb. The only way a cutter could have been made so that all of the teeth would stop on a center of a tooth at the end of the stroke would be to have a nine-tooth cutter which would place the prongs of the cutter so close together as to prevent the wool from entering between the prongs of the cutter when it was oscillated at a high speed and the cutting blades were being pushed through the wool rapidly. The cutter must travel at relatively high speeds, commonly through 2000 to 2500 cycles per minute, thus passing across the comb 4000 to 5000 times per minute. If a cutter of this kind were to be used on a ten-tooth comb, it would be necessary to push the cutting blades through the wool very slowly so as to allow the wool to enter between the prongs of the cutter which would, of course, materially impair the efficiency of the shearing machine. On the other hand, speed of the cutter is necessary for efficient shearing and it is a common experience in shearing sheds to have the shearers call for more speed when the speed of the cutter drops below about 2000 cycles per minute, complaining that the hand piece or shearing machine is dragging in the wool. According to my invention shearing combs of extra width are produced without any of the objectionable features heretofore encountered and resulting in material improvement in shearing machines.

An important object of the invention is the provision of a shearing machine of greater efficiency than those heretofore known, wherein the machine can be moved through the wool with greater ease and speed.

Another object of the invention is the provision of a shearing machine of cutting widths heretofore unobtainable.

A further object of the invention is the provision of a shearing comb of improved characteristics.

I have also aimed to provide an improved comb which permits of passage of the comb through the wool with a lesser drag and permits a greater latitude in the width of the comb without impairment in its shearing qualities.

Other objects and attendant advantages will become apparent to those skilled in the art from the following description and accompanying drawing, in which—

Figure 1 is a section through a shearing hand piece embodying my invention;

Fig. 2 is a top view of a ten-tooth comb and a three-tooth cutter used therewith shown in operative relationship;

Fig. 3 is a top view of a thirteen-tooth comb and four-tooth cutter in operative relationship, and Fig. 4 is a fragmentary view of a comb and cutter with the movement of the crank pin, which drives the cutter, superimposed thereon for illustrative purposes.

In Figure 1, I have shown a shearing hand piece of known general construction having a casing designated generally by the numeral 14 which also acts as a handle by means of which the cutters are moved through the wool. A bearing 15 is positioned in the hollow casing and carries a driven shaft 16, which acts to drive the cutter. The forward end of the shaft 16 carries a crank 17 having an eccentric crank pin 18. The crank pin 18 carries a ball 19 which seats in a socket 21 within which the ball has longitudinal movement as the crank rotates in a well known manner. The socket 21 is positioned on the end of a fork 22 which is pivoted intermediate its ends on a pin 23 in the casing. The forward end of the fork 22 has a plurality of spaced fingers 24 and 25 which engage and bear against a cutter in this instance being a four-prong cutter designated generally by the numeral 26. The cutter bears against the face of a comb in this instance a thirteen-tooth comb designated generally by the numeral 27 attached to the forward end of the casing 14 through openings 28 and slots 29, which cooperate with complemental parts in the casing for the purpose of positioning and securing the comb in place. Pressure is applied to the cutter 26 by means of a pin 31 which bears against the fork and urges the cutter against the comb in the manner well known in this type of shearing machine. Rotation of the shaft 16 thus causes rotation of the crank 17, bringing about oscillation of the fork 22 and consequently of the cutter 26 so that the cutter moves side to side of the comb making a movement across and back with each rotation of the shaft 16. As a result, it will be noted that the fork and the cutter come to a dead stop at each side of the stroke with the outside prong of the cutter on the outside tooth of the comb.

In Fig. 4, I have represented the circular movement of the crank pin by a dotted circle and the corresponding movement of the cutter by a dotted straight line on the diameter of this circle. In other words, as the crank pin moves around the circle, the cutter moves backward and forward proportionally on the diameter of the circle in a simple harmonic motion. In order to illustrate the relationship between these two movements, I have divided the circle into equal parts, each representing a rotary movement of 22½°. Thus, between the points A and B of the circle, the crank pin 9 has moved 22½° and likewise between the points B and C, C and D, and D and E, it has moved an equivalent amount. Since the shaft 16 rotates at a substantially uniform speed, the time required for the crank pin to move through these angles is uniform. Therefore, assuming that the cutter has come to a dead stop at the end of its stroke, it occupies the position shown in Fig. 4 directly over the end tooth of the comb. In unit time thereafter, the crank pin will have moved through the arc A—B and in the same time the cutter will have moved through the distance (a). During the next 22½° movement the cutter will have moved through the distance (b), in other words, more than twice the distance represented by (a) in the same length of time, so that its average speed was more than twice the average speed in covering the distance (a). Likewise, the crank will move through the arc C—D in unit time and the cutter will move through the distance (c) in the same time, a distance more than three times greater than the distance (a). Again in unit time, the crank pin will move between D and E in the next unit of time while the cutter will move through the distance (d), a distance more than four times greater than the distance (a), in the same length of time it was driven through the distance (a) so that its average speed in covering the distance (d) was more than four times as great as its average speed in covering the distance (a). It will be seen that in the next succeeding units of time, the speed of the cutter will successively decrease in the same manner as it increased to the center of its travel. It will thus be seen that the cutter starts at zero speed and progressively increases its speed up to the center of its stroke and thereafter decreases its speed.

The effect of the speed of the cutter upon shearing has previously been referred to and it will be apparent that the cutter will not cut the wool as easily when moving at a low speed as it does when traveling at a high speed. This may be demonstrated in a homely fashion by pushing a rod against an upstanding slender reed, such as the stem of a weed. When pushed slowly, the weed merely bends over and the rod passes over it. If, however, the stem is struck rapidly with the rod at high speed, the weed will be cut off clean. My investigations have shown that with the combs and cutters as made in the past if the cutting edges are slightly dull, the cutter has a tendency to ride over the wool and not cut it clean, due to its relatively slow motion at the beginning and at the end of the stroke. This is one of the causes why the ten-tooth comb having a spacing of greater than ¼" proved unsatisfactory, that is, because the capacity of the shear was limited by the ability of the cutter to sever the wool during this initial movement.

According to my invention, the spaces between the teeth of the comb are unequal, the teeth having a wider spacing in the area where the cutter has its highest speed so that a lesser proportion of the wool is drawn in between the teeth of the comb in the areas where the cutter has its lower speed and a greater proportion of wool in the areas where the cutter has its highest speed. Thus, referring to Fig. 2, I have made the distance between comb teeth 2 and 3 greater than the distance between the teeth 1 and 2 thereof, and likewise the distance between the teeth 5 and 6 greater than the distance between the teeth 4 and 5 and the teeth 6 and 7, and again the distance between the teeth 8 and 9 greater than the distance between these teeth and the next adjoining teeth, so that the prongs 32, 33, and 34 of a three-prong cutter 35 pass over these wider spaces at the center of their travel and over the smaller spaces at each end of their travel. As a result, the prongs of the cutter will each be required to cut a smaller amount of wool at the start and close of their travel when they are moved at their lower speeds, and a greater proportion of the wool in the center of their travel when they are moving at high speed. With the thirteen-tooth comb 27 and four-tooth cutter 26 as shown in Fig. 3, the structure is identical with that shown in Fig. 2, with the exception that an additional three teeth 11, 12 and 13 are added to the comb and an additional prong 36 is added to the cutter. In this instance, the distance between teeth 11 and 12 of the comb will be greater than the distance between these teeth and the adjacent teeth.

I use this principle in the accomplishment of two different though related results. In the manufacture of a certain class of combs, the distance between the teeth 1 and 2 is left as at present at 1/4" since the cutter is able to handle the amount of wool brought in by this spacing of the teeth. The distance between the teeth 2 and 3, 5 and 6, and 8 and 9 is increased proportionately, in this instance to 1/3" so as to widen the comb and bring the total width of the comb to 2 1/2", a result which has been known by comb manufacturers for many years but has not heretofore been successfully accomplished. In this case, the prongs of the cutter will, of course, be made of such spacing that in the position shown in Fig. 2, the prongs of the cutter will stop at the end of its throw directly over the teeth 1, 4 and 7. However, the invention is of value entirely aside from the widening of the comb and in many cases the comb is made with the distance between teeth 2 and 3, 5 and 6, and 8 and 9, greater than the standard 1/4" as above mentioned, whereas, the distance between these teeth and their adjacent teeth, as for example, the teeth 1 and 2, 3 and 4, 4 and 5, etc., will be of slightly lesser spacing so that the total width of the comb will remain at 2 1/4" as at present. In this manner, the drag on the cutters occasioned by the slow speed of the cutter proper at the start and close of its stroke will be eliminated. In actual service, it has been shown that shearing devices made in accordance with this invention run easier, that they cut the wool much more freely so that less effort is required to push the cutter through the wool and they can, therefore, be pushed through at a much more rapid speed. It has also been shown that the cutters will continue to cut freely and efficiently much longer than in the past without the need of resharpening. This is doubtless due to the fact that the cutter prongs are not required to cut such a great proportion of the wool during the periods of their low speed but instead cut a greater proportion in the high speed area, that is, in the area represented by the letter $(d)$, as distinguished from the area represented by the letters $(a)$ and $(b)$.

Thus, I have provided means whereby the shearing action is distributed in the cutters in the manner in which the cutters are best able to handle the same. As a result, I am enabled to produce a comb which has heretofore been greatly desired but impossible of attainment. Likewise, I am enabled to produce a shearing device which is more efficient in operation because of the greater speed with which the cutters may be pushed through the wool, because of the greater width of the cutters and because of the greater length of time the cutters may be used without resharpening.

While I have thus described and illustrated specific embodiments of my invention, I am aware that numerous alterations and changes may be made therein without departing from the spirit of the invention and I do not wish to be limited except as required by the prior art and the scope of the appended claims, in which—

I claim:

1. A comb for shearing machines comprising a body and a plurality of teeth wherein the space between the second and third teeth, and each third space therebeyond is greater than the remaining spaces between the comb teeth.

2. The combination in a shearing machine of a comb having a plurality of spaced teeth, the spaces between the second and third teeth, the fifth and sixth teeth, and so forth, in like series being greater than the remaining spaces between the teeth, and a cutter reciprocable thereon from side to side of the comb having prongs so spaced that they may come to rest on the first and every third tooth of the comb therebeyond.

3. The combination in a shearing machine of a comb having a plurality of teeth, a cutter having a prong reciprocable on the comb and across the teeth with a simple harmonic motion, said teeth being arranged so that the teeth traversed by the prong near the center of its travel are spaced apart a greater distance than the teeth near the ends of its travel.

4. The combination in a shearing machine of a comb having a plurality of teeth, a cutter having a plurality of prongs, said cutter being reciprocable on the comb with a simple harmonic motion to cause each of the prongs to traverse a predetermined number of comb teeth, said teeth being unequally spaced according to a definite sequence, the spacing being such that the teeth traversed by each prong near the center of its travel are spaced apart a greater distance than the teeth near the ends of its travel.

5. A comb for shearing machines of the type having a pronged cutter reciprocable with a simple harmonic motion comprising a body and a row of teeth thereon, the points of which are unequally spaced according to a definite cycle repeated along the row, the length of each cycle being equal to the stroke of the cutter, the teeth of each cycle being arranged so that the wider spacings thereof lie at the center of the cycle.

6. A comb of the character described having a body for carrying a cutter in a simple harmonic motion and a plurality of teeth for combing and directing wool into the cutter, the teeth being arranged with wide and narrow spaces therebetween at predetermined points to direct a greater amount of wool between the teeth across which the cutter travels at its highest speed.

7. A comb of the character described having a body for carrying a cutter in a simple harmonic motion in which the spacing of adjacent teeth of a given portion defined by the teeth traversed by a prong of the cutter is less at the extremities of said portion than the spacing between adjacent teeth intermediate the first mentioned teeth.

HORACE C. WRIGHT.